(12) United States Patent
Kumatani et al.

(10) Patent No.: US 11,969,712 B2
(45) Date of Patent: Apr. 30, 2024

(54) CATALYST FOR PURIFICATION OF EXHAUST GAS AND PRODUCTION METHOD THEREOF

(71) Applicant: TOYOTA JIDOSHA KABUSHIKI KAISHA, Toyota (JP)

(72) Inventors: Naoki Kumatani, Nagakute (JP); Akira Morikawa, Nagakute (JP); Masaoki Iwasaki, Nagakute (JP); Miho Hatanaka, Nagakute (JP); Taizo Yoshinaga, Susono (JP); Masahide Miura, Toyota (JP); Takahiro Hayashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/979,571

(22) Filed: Nov. 2, 2022

(65) Prior Publication Data
US 2023/0302435 A1  Sep. 28, 2023

(30) Foreign Application Priority Data
Mar. 22, 2022  (JP) ................ 2022-045664

(51) Int. Cl.
*B01J 21/04* (2006.01)
*B01D 53/94* (2006.01)
(Continued)

(52) U.S. Cl.
CPC ............. *B01J 23/63* (2013.01); *B01D 53/94* (2013.01); *B01J 23/10* (2013.01); *B01J 35/23* (2024.01);
(Continued)

(58) Field of Classification Search
CPC ......... B01J 21/04; B01J 21/066; B01J 23/10; B01J 23/44; B01J 23/63; B01J 35/0013; B01J 35/0066
(Continued)

(56) References Cited

U.S. PATENT DOCUMENTS 9,409,152 B2 * 8/2016 Kumatani ............. B01J 35/023
9,901,907 B1 * 2/2018 Xiao ....................... F01N 3/101
(Continued)

FOREIGN PATENT DOCUMENTS

| JP | 2007-105633 A | 4/2007 |
| JP | 2010-012397 A | 1/2010 |
| WO | 2006/067912 A1 | 6/2006 |

*Primary Examiner* — Cam N. Nguyen
(74) *Attorney, Agent, or Firm* — Oliff PLC

(57) ABSTRACT

A catalyst for purification of exhaust gas in which Pd-based nanoparticles and ceria nanoparticles are supported on a composite metal oxide support containing alumina, ceria, and zirconia, wherein a molar ratio (Ce/Pd) of Ce and Pd supported on the support is 1 to 8, a proximity α between Pd and Ce is 0.15 to 0.50, wherein the proximity α is determined, based on Pd and Ce distribution maps in an element mapping image of energy dispersive X-ray analysis, by the following formula (1):

$$\alpha = \frac{\sum_{j=0}^{N-1}\sum_{i=0}^{M-1}((I(i,j)-I_{ave})(T(i,j)-T_{ave}))}{\sqrt{\sum_{j=0}^{N-1}\sum_{i=0}^{M-1}(I(i,j)-I_{ave})^2 \cdot \sum_{j=0}^{N-1}\sum_{i=0}^{M-1}(T(i,j)-T_{ave})^2}}, \quad (1)$$

a Pd dispersity after a heat-resistance test at 1050° C. for 25 hours is 0.8% or more.

10 Claims, 4 Drawing Sheets

(51) Int. Cl.
   *B01J 21/06* (2006.01)
   *B01J 23/10* (2006.01)
   *B01J 23/44* (2006.01)
   *B01J 23/63* (2006.01)
   *B01J 35/00* (2006.01)
   *B01J 35/23* (2024.01)
   *B01J 35/30* (2024.01)
   *B01J 37/02* (2006.01)

(52) U.S. Cl.
   CPC ......... *B01J 35/394* (2024.01); *B01J 37/0221* (2013.01); *B01J 37/0228* (2013.01); *B01J 37/0244* (2013.01); *B01D 2255/1023* (2013.01); *B01D 2255/2065* (2013.01); *B01D 2255/908* (2013.01)

(58) Field of Classification Search
   USPC .......................... 502/304, 334, 349, 355, 415
   See application file for complete search history.

(56) References Cited

U.S. PATENT DOCUMENTS

| | | | |
|---|---|---|---|
| 10,035,133 B2 * | 7/2018 | Yang | B01J 23/58 |
| 10,427,137 B2 * | 10/2019 | Kyriakidou | B01J 37/0207 |
| 10,695,749 B2 * | 6/2020 | Xiao | B01J 23/60 |
| 10,919,026 B2 * | 2/2021 | Xiao | B01J 23/89 |
| 11,285,467 B2 * | 3/2022 | Clowes | B01D 53/86 |
| 11,358,127 B2 * | 6/2022 | Armitage | B01J 35/04 |
| 11,642,658 B2 * | 5/2023 | Kitamoto | B01J 35/0006 502/339 |
| 2009/0280978 A1 | 11/2009 | Nakamura et al. | |
| 2019/0240643 A1 * | 8/2019 | Karpov | B01J 23/44 |
| 2019/0388838 A1 * | 12/2019 | Luo | B01D 53/945 |
| 2022/0212178 A1 * | 7/2022 | Liu | F01N 3/2842 |

* cited by examiner

CATALYST FOR PURIFICATION OF EXHAUST GAS AND PRODUCTION METHOD THEREOF

BACKGROUND OF THE INVENTION

Field of the Invention

The present invention relates to a catalyst for purification of exhaust gas and a method of producing the same, and more specifically to a catalyst for purification of exhaust gas in which palladium and ceria are supported on a composite metal oxide support containing alumina, ceria, and zirconia, and a method of producing the same.

Related Background Art

As a catalyst for purification of exhaust gas that can simultaneously oxidize carbon monoxide (CO) and hydrocarbon (HC) and reduce nitrogen oxides (NOx), which are contained in the exhaust gas from internal combustion engines such as automotive engines, three-way catalysts are widely known in which a noble metal such as platinum, rhodium, or palladium is supported on a metal oxide support made of alumina, titania, silica, zirconia, ceria, or the like. In such a catalyst for purification of exhaust gas, in order to absorb fluctuations in oxygen concentration in the exhaust gas and improve exhaust gas purification performance, a material having an oxygen storage capacity (CSC) that can store oxygen when the oxygen concentration in the exhaust gas is high and release oxygen when the oxygen concentration in the exhaust gas is low is used as a support or a promoter for a catalyst for purification of exhaust gas.

As a catalyst for purification of exhaust gas using such an oxygen storage material, for example, Japanese Unexamined Patent Application Publication No. 2010-12397 (Patent Document 1) discloses a catalyst material for purification of exhaust gas including alumina particles, CeZr-based composite metal oxide particles having oxygen storage/release performance, and Pd. In this catalyst material for purification of exhaust gas, Pd is doped and fixed only to CeZr-based composite metal oxide particles to improve the oxygen storage/release performance, and further, these CeZr-based composite metal oxide particles are dispersed and supported on the surface of the alumina particles to prevent sintering between the CeZr-based composite metal oxide particles, so that excellent purification performance is maintained even when exposed to high-temperature exhaust gas. In addition, Patent Document 1 also states that such an exhaust gas purification catalyst material is obtained by mixing a coprecipitate containing Ce, Zr, and Pd with a precipitate containing Al, and then drying and calcining.

Meanwhile, Japanese Unexamined Patent Application Publication No. 2007-105633 (Patent Document 2) discloses a catalyst for purification of exhaust gas including a support composed of a metal oxide containing at least one of $Al_2O_3$, $ZrO_2$, $SiO_2$, $TiO_2$, and $CeO_2$, palladium oxide (PdO) particles supported on this support, and rare earth oxide (LnOx) particles supported on the support in contact with these palladium oxide (PdO) particles. In this catalyst for purification of exhaust gas, PdO particles and LnOx particles coexist on the support to inhibit metallization from PdO to Pd, and the aggregation of Pd particles is prevented to maintain high catalytic activity even in a high temperature range. In addition, Patent Document 2 also states that such a catalyst for purification of exhaust gas is obtained by evaporating water content from an aqueous solution containing the support, a Pd precursor, and an Ln precursor, and then calcining the obtained dry powder.

SUMMARY OF THE INVENTION

However, in the catalyst for purification of exhaust gas described in Patent Documents 1 and 2, hydrocarbons (HC) are adsorbed and poisoned on the surface of Pd in low temperature ranges immediately after the start of internal combustion engines such as automotive engines, so that sufficient catalytic activity cannot be obtained and the oxygen storage release performance after exposure to high temperature is not sufficient.

The present invention has been made in view of the above-mentioned problems of the related art, and an object thereof is to provide a catalyst for purification of exhaust gas which is excellent in catalytic activity at low temperature and also excellent in oxygen storage/release performance after exposure to high temperature, and a method of producing the same.

The present inventors have made earnest studies to achieve the above object, and have found as a result that when ceria nanoparticles are supported on a composite metal oxide support containing alumina, ceria, and zirconia, and then Pd-containing nanoparticles are supported thereon so that Ce and Pd have a specific molar ratio, a catalyst for purification of exhaust gas is obtained in which the Pd-containing nanoparticles are dispersed and supported, and the ceria nanoparticles and the Pd-containing nanoparticles are supported in proximity to each other, and this catalyst for purification of exhaust gas is excellent in catalytic activity at low temperature and also in oxygen storage/release performance after exposure to high temperature. Thus, the present invention has been completed.

Specifically, the present invention provides the following aspects.

[1] A catalyst for purification of exhaust gas in which Pd-based nanoparticles composed of Pd or Pd oxide and ceria nanoparticles represented by a compositional formula $CeO_{2-x}$ (0≤x<0.5) are supported on a composite metal oxide support containing alumina, ceria, and zirconia, wherein a molar ratio (Ce/Pd) of Ce and Pd supported on the composite metal oxide support is 1 to 8, a proximity α between Pd and Ce is 0.15 to 0.50, wherein the proximity α is determined, based on a Pd distribution map and a Ce distribution map in an element mapping image obtained by energy dispersive X-ray analysis, by the following formula (1):

$$\alpha = \frac{\sum_{j=0}^{N-1}\sum_{i=0}^{M-1}((I(i,j)-I_{ave})(T(i,j)-T_{ave}))}{\sqrt{\sum_{j=0}^{N-1}\sum_{i=0}^{M-1}(I(i,j)-I_{ave})^2 \cdot \sum_{j=0}^{N-1}\sum_{i=0}^{M-1}(T(i,j)-T_{ave})^2}} \quad (1)$$

[In the formula (1), I(i, j) represents a luminance value in a section (i, j), which is i-th in a horizontal direction and j-th in a vertical direction, when the Pd distribution map is divided into M pieces in the horizontal direction and N pieces in the vertical direction, represents an average luminance value in the Pd distribution map, T(i, j) represents a luminance value in a section (i, j), which is i-th in a horizontal direction and j-th in a vertical direction, when the Ce distribution map is divided into M pieces in the horizontal direction and N pieces in the vertical direction, and $T_{ave}$ represents an average luminance value in the Ce distribution map.], and a Pd dispersity after a heat-resistance test is 0.8% or more, wherein the heat-resistance test is conducted by heating at 1050° C. for 25 hours while alternately flowing rich gas ($H_2$ (2 vol %)+$CO_2$ (10 vol %)+$H_2O$ (3 vol %)+$N_2$ (balance)) and lean gas ($O_2$ (1 vol %)+$CO_2$ (10 vol %)+$H_2O$ (3 vol %)+$N_2$ (balance)) at a flow rate of 0.5 L/min every 5 minutes.

[2] The catalyst for purification of exhaust gas according to [1], wherein a Ce concentration β in the vicinity of the Pd-based nanoparticles is 16% or more, wherein the Ce concentration β is determined, based on an element mapping image obtained by energy dispersive X-ray analysis, by the following formula (2)

$$\beta = \frac{1}{n}\sum_{k=1}^{n}\left(C_{Ce}/\left(C_{Pd} + C_{Al} + C_{Ce} + \sum C_M\right) \times 100\right) \quad (2)$$

[In the formula (2), n is a total number of regions of 162.0 nm in length×162.0 nm in width centered on the Pd-based nanoparticles randomly extracted in the element mapping image, and $C_{Ce}$, $C_{Pd}$, $C_{Al}$, and $C_M$ represent concentrations of Ce, Pd, Al, and other metal. N in respective extracted regions.].

[3] The catalyst for purification of exhaust gas according to [1], wherein a Pd dispersity after heating at 500° C. for 5 hours in the atmosphere is 15% or more.

[4] The catalyst for purification of exhaust gas according to [2], wherein a Pd dispersity after heating at 500° C. for 5 hours in the atmosphere is 15% or more.

[5] A method of producing a catalyst for purification of exhaust gas, comprising:
supporting ceria nanoparticles represented by a compositional formula $CeO_{2-x}$ (0≤x<0.5) on a composite metal oxide support containing alumina, ceria, and zirconia, and then supporting Pd-based nanoparticles composed of Pd or Pd oxide thereon so that a molar ratio (Ce/Pd) of Ce and Pd supported on the composite metal oxide support is 1 to 8.

[6] The method of producing a catalyst for purification of exhaust gas according to [5], wherein the composite metal oxide support containing alumina, ceria, and zirconia is impregnated with a compound containing tetravalent Ce to support the ceria nanoparticles on the composite metal oxide support.

[7] The method of producing a catalyst for purification of exhaust gas according to [6], wherein the compound containing tetravalent Ce is a nitrate of the tetravalent Ce.

[8] The method of producing a catalyst for purification of exhaust gas according to [5], wherein the composite metal oxide support containing alumina, ceria, and zirconia is impregnated with palladium nitrate to support the Pd-based nanoparticles on the composite metal oxide support.

[9] The method of producing a catalyst for purification of exhaust gas according to [6], wherein the composite metal oxide support containing alumina, ceria, and zirconia is impregnated with palladium nitrate to support the Pd-based nanoparticles on the composite metal oxide support.

[10] The method of producing a catalyst for purification of exhaust gas according to [7], wherein the composite metal oxide support containing alumina, ceria, and zirconia is impregnated with palladium nitrate to support the Pd-based nanoparticles on the composite metal oxide support.

It is not exactly clear why the catalyst for purification of exhaust gas of the present invention is excellent in catalytic activity at low temperature and also in oxygen storage/ release performance after exposure to high temperature, but the present inventors inter as follows. Specifically, in a catalyst for purification of exhaust gas obtained by the conventional support method whereby ceria-Pd coprecipitates are supported, a Pd-supported composite metal oxide powder and ceria powder are physically mixed, or ceria and Pd are simultaneously supported on a composite metal oxide support containing alumina, ceria, and zirconia, Pd is buried in ceria, or the contact points between Pd and $CeO_{2-x}$ are insufficient, so that the interaction between ceria and Pd (oxygen transfer at the interface between Pd and $CeO_{2-x}$) cannot be sufficiently obtained, with hydrocarbons (HO) adsorbed and poisoned on the surface of Pd-based nanoparticles, and thus sufficient catalytic activity at low temperatures fails to be exhibited.

Further, when nanoparticles containing metal atoms such as Ba, La, Fe, and Co, which have HO poisoning prevention effects and HC oxidation accelerating effects, are supported instead of ceria nanoparticles in order to prevent the adsorption poisoning of HO on the surface of Pd-based nanoparticles, the metal atoms react with alumina or zirconia in a solid phase in a high temperature environment, so that the oxygen storage/release performance after exposure to a high temperature is lowered.

On the other hand, in the catalyst for purification of exhaust gas of the present invention, ceria nanoparticles are supported on a composite metal oxide support containing alumina, ceria, and zirconia, and then Pd-containing nanoparticles are supported thereon, so that the ceria nanoparticles and the Pd-based nanoparticles are supported in proximity to each other. In such a catalyst for purification of exhaust gas in which the ceria nanoparticles and the Pd-based nanoparticles are supported in proximity to each other, by the interaction between the ceria nanoparticles and Pd, specifically, by oxygen transfer at the interface between Pd and $CeO_2$, Ce is reduced to generate oxygen defects and free oxygen, which improves the HC oxidation activity at the three-phase interface among Pd, $CeO_{2-x}$, and the gas phase, and prevents the adsorption poisoning of HC on the surface of Pd-based nanoparticles, so that excellent catalytic activity even at low temperatures is exhibited.

Further, in the catalyst for purification, of exhaust gas of the present invention, it is inferred that the ceria nanoparticles and the Pd-based nanoparticles do not react even when exposed to a high temperature, so that excellent oxygen storage/release performance is maintained. Furthermore, excellent oxygen storage/release performance is maintained even when the ceria nanoparticles reacts in part with the oxygen storing/releasing material (ceria-zirconia solid solution), and they remain in the vicinity of the Pd-based nanoparticles to prevent the adsorption poisoning of HC on the surface of the Pd-based nanoparticles, so that it is presumed that the catalyst for purification of exhaust gas of the present invention exhibits excellent catalytic activity even at low temperatures.

The present invention makes it possible to obtain a catalyst for purification of exhaust gas which is excellent in catalytic activity at low temperature and also in oxygen storage/release performance after exposure to high temperature.

DETAILED DESCRIPTION OF THE PREFERRED EMBODIMENTS

Figure 1:
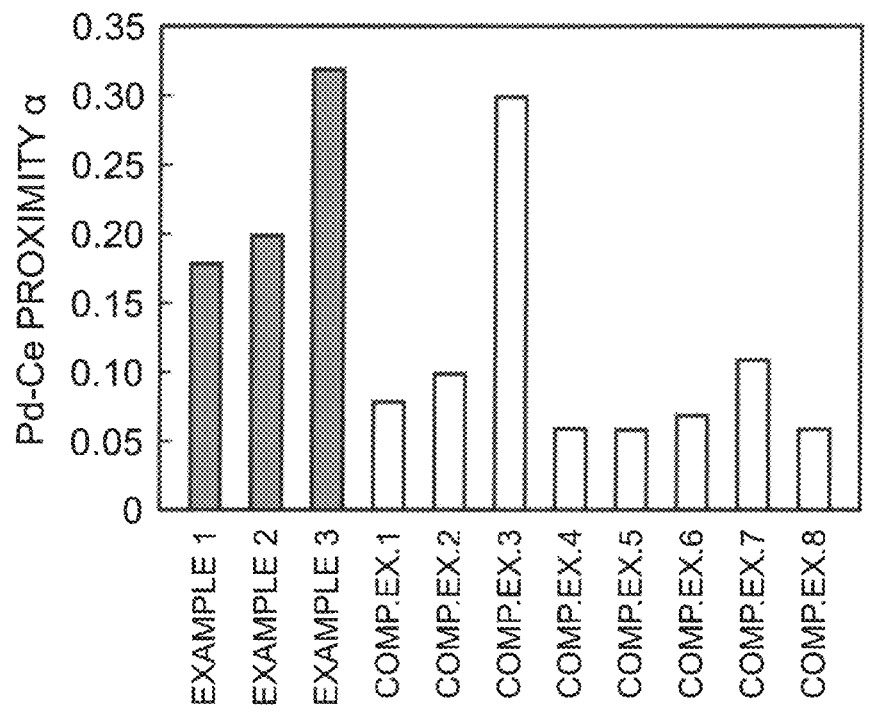
FIG. 1 is a graph showing the proximity α between Pd and Ce supported on a metal oxide support in the catalyst powders obtained in Examples and Comparative Examples.

Hereinafter, the present invention is described in detail according to preferred embodiments thereof.

[Catalyst for Purification of Exhaust Gas]

First, the catalyst for purification of exhaust gas of the present invention is described. The catalyst for purification of exhaust gas of the present invention is such that Pd-based nanoparticles composed of Pd or Pd oxide and ceria nanoparticles represented by a compositional formula $CeO_{2-x}$ ($0 \leq x < 0.5$) are supported on a composite metal oxide support containing alumina, ceria, and zirconia.

Examples of the support used in the present invention include conventionally known composite metal oxide supports used for a catalyst for purification of exhaust gas and containing alumina, ceria, and zirconia. The content of alumina in such a composite metal oxide support is preferably 20 to 40% by mass. If the content of alumina is less than the lower limit, the specific surface area of the composite metal oxide support decreases, so that the catalytic activity at low temperature tends to decrease. Meanwhile, if the content of alumina exceeds the upper limit, the oxygen storage capacity (OSC) of the composite metal oxide support decreases, so that the catalytic activity at low temperature tends to decreas.

The molar ratio of ceria to zirconia in the composite metal oxide support is preferably ceria:zirconia=2:8 to 5:5. If the molar ratio of ceria to zirconia is less than the lower limit, the oxygen storage capacity (OSC) of the composite metal oxide support decreases, so that the catalytic activity at low temperature tends to decrease. Meanwhile, if the molar ratio of ceria to zirconia exceeds the upper limit, the heat resistance of the ceria-zirconia composite metal oxide is lowered, which leads to a phase separation and a significant decrease in the specific surface area of the ceria-zirconia composite metal oxide, so that the catalytic activity at low temperature tends to decrease.

Further, the composite metal oxide support used in the present invention may contain an additional metal oxide including Sc, Ti, Y, or Hf oxides, or lanthanoid oxide such as La, Pr, Nd, or Sm oxides. Among these metal oxides, Y, La, Nd, and Pr oxides are preferable.

The Pd-based nanoparticles used in the present invention are nanoparticles composed of Pd or Pd oxide (PdO), that is, Pd nanoparticles, Pd oxide nanoparticles, or a mixture thereof, and serve as active sites in the catalyst for purification of exhaust gas of the present invention. At these active sites, oxygen is received from the nearby ceria nanoparticles, and the oxidation reaction of hydrocarbons (HC) and the like proceeds.

The ceria nanoparticles used in the present invention are nanoparticles represented by the composition formula $CeO_{2-x}$ ($0 \leq x < 0.5$) and act as an oxygen storage capacity material (OSC material). In the catalyst for purification of exhaust gas of the present invention, these ceria nanoparticles are close to the Pd-based nanoparticles, so that oxygen is sufficiently transferred between the Pd-based nanoparticles and the ceria nanoparticles, which prevents adsorption poisoning of HC, and thus excellent catalytic activity even at low temperatures is exhibited.

In the catalyst for purification of exhaust gas of the present invention, the molar ratio (Ce/Pd) of Ce and Pd supported on the composite metal oxide support is 1 to 8, When Ce/Pd is within the above range, the interface between the Pd-based nanoparticles and the ceria nanoparticles is sufficiently formed, so that oxygen is sufficiently transferred between the Pd-based nanoparticles and the ceria nanoparticles, which prevents adsorption poisoning of HC, and thus excellent catalytic activity even at low temperatures is exhibited. On one hand, if Ce/Pd is less than the lower limit, the interface between the Pd-based nanoparticles and the ceria nanoparticles is not sufficiently formed, so that it becomes difficult to transfer oxygen between the Pd-based nanoparticles and the ceria nanoparticles for the prevention of adsorption poisoning of HC, and thus sufficient catalytic activity at low temperatures fails to be exhibited. On the other hand, if Ce/Pd exceeds the upper limit, the interface between the Pd-based nanoparticles and the coria nanoparticles increases, but Pd is covered, so that the contact with the reaction gas is reduced, and the specific surface area is reduced due to the pore blockage of the support, and thus sufficient catalytic activity at low temperatures fails to be exhibited. In addition, from the viewpoint of further preventing the adsorption poisoning of HC and improving the catalytic activity at low temperature, Ce/Pd is preferably 1 to 5, more preferably 2 to 5, and particularly preferably 2 to 4.

Further, in the catalyst for purification of exhaust gas of the present invention, a proximity α between Pd and Ce is 0.15 to 0.50, wherein the proximity α is determined, based on a Pd distribution map and a Ce distribution map in an element mapping image (EDX element mapping image) obtained by energy dispersive X-ray analysis (EDX), by the following formula (1):

$$\alpha = \frac{\sum_{j=0}^{N-1} \sum_{i=0}^{M-1} ((I(i, j) - I_{ave})(T(i, j) - T_{ave}))}{\sqrt{\sum_{j=0}^{N-1} \sum_{i=0}^{M-1} (I(i, j) - I_{ave})^2 \cdot \sum_{j=0}^{N-1} \sum_{i=0}^{M-1} (T(i, j) - T_{ave})^2}} \quad (1)$$

[In the formula (1), I(i, j) represents a luminance value in a section (i, j), which is i-th in a horizontal direction and j-th in a vertical direction, when the Pd distribution map is divided into M pieces in the horizontal direction and N pieces in the vertical direction, $I_{ave}$ represents an average luminance value in the Pd distribution map, T(i, j) represents a luminance value in a section (i, j), which is i-th in a horizontal direction and j-th in a vertical direction, when the Ce distribution map is divided into M pieces in the horizontal direction and N pieces in the vertical direction, and $T_{ave}$ represents an average luminance value in the Ce distribution map.]. When the proximity α between Pd and Ce is within the above range, the interaction between ceria and Pd prevents the adsorption poisoning of HC on the surface of Pd-based nanoparticles and does not inhibit the metallization of Pd, and thus excellent catalytic activity even at low temperatures is exhibited. On one hand, if the proximity α between Pd and Ce is less than the lower limit, the interaction between ceria and Pd is not sufficiently expressed, so that I-1C is adsorbed and poisoned on the surface of Pd-based nanoparticles, and thus sufficient catalytic activity at low temperatures fails to be exhibited. On the other hand, if the proximity α between Pd and Ce exceeds the upper limit, the interface between the Pd-based nanoparticles and the ceria nanoparticles increases, but Pd is covered, so that the contact with the reaction gas is reduced, and the specific surface area is reduced due to the pore blockage of the support, and thus sufficient catalytic activity at low temperatures may fail to be exhibited. Further, from the viewpoint that the adsorption poisoning of HC is further prevented and the metallization of Pd is less likely to be inhibited so that the catalytic activity at low temperature is improved, the proximity α between Pd and Ce is preferably 0.18 to 0.45, more preferably 0.20 to 0.40, and particularly preferably 0.25 to 0.35.

The EDX element mapping image can be obtained, for example, by performing EDX analysis under the condition of a field magnification: $1.2 \times 10^6$ times using a scanning transmission electron microscope equipped with an energy dispersive X-ray analyzer. The proximity α between Pd and Ce can be obtained by calculating the coefficient value of the zero-means normalized cross-correlation (ZNCC) for the Pd distribution map and the Ce distribution map in the EDX element mapping image, using image processing software ImageJ, Matlab, or the like.

Further, in the catalyst for purification of exhaust gas of the present invention, a Pd dispersity after a heat-resistance test is 0.8% or more, wherein the heat-resistance test is conducted by heating at 1050° C. for 25 hours while alternately flowing rich gas ($H_2$(2 vol %)+$CO_2$ (10 vol %)+$H_2O$ (3 vol %)+$N_2$ (balance)) and lean gas ($O_2$(1 vol %)+$CO_2$(10 vol %)+$H_2O$ (3 vol %)+$N_2$(balance)) at a flow rate of 0.5 L/min every 5 minutes. When the Pd dispersity after the heat-resistance test is within the above range, the surface area of the active Pd-based nanoparticles for the purification reaction to proceed is secured, and thus the catalytic activity at low temperature is ensured. Meanwhile, if the Pd dispersity after the heat-resistance test is less than the lower limit, the surface area of the active Pd-based nanoparticles for the purification reaction to proceed is insufficient, and thus the catalytic activity at low temperature decreases. In addition, the Pd-based nanoparticles may be coated or buried with the cerin nanoparticles, in which case the contact between the Pd-based nanoparticles and the reaction gas decreases, so that the catalytic activity at low temperature tends to decrease. Further, from the viewpoint of improving the catalytic activity at low temperature, the Pd dispersity after the heat-resistance test is preferably 0.8 to 50%, more preferably 0.9 to 50%, and particularly preferably 1 to 50%.

The Pd dispersity can be calculated using the amount of CO adsorbed and the amount of Pd supported by the following formula:

Pd dispersity[%]=amount of CO adsorbed[mol]/
amount of Pd supported[mol]×100 wherein the amount of CO adsorbed is obtained by measuring the amount of CO adsorbed for the catalyst for purification of exhaust gas.

Further, in the catalyst for purification of exhaust gas of the present invention, a Ce concentration β in the vicinity of the Pd-based nanoparticles is preferably 16% or more, wherein the Ce concentration β is determined, based on an element mapping image obtained by energy dispersive X-ray analysis, by the following formula (2):

$$\beta = \frac{1}{n}\sum_{k=1}^{n}(C_{Ce}/(C_{Pd} + C_{Al} + C_{Ce} + \sum C_M) \times 100) \qquad (2)$$

[In the formula. (2), n is a total number of regions of 162.0 nm in length×162.0 nm in width centered on the Pd-based nanoparticles randomly extracted in the element mapping image, and $C_{Ce}$, $C_{Pd}$, $C_{Al}$, and $C_M$ represent concentrations of Ce, Pd, Al, and other metal M in respective extracted regions.].

When the Ce concentration β in the vicinity of the Pd-based nanoparticles is within the above range, the interface between the Pd-based nanoparticles and the ceria nanoparticles is sufficiently formed, so that oxygen is sufficiently transferred between the Pd-based nanoparticles and the ceria nanoparticles, which makes it likely to prevent adsorption poisoning of HC, and thus excellent catalytic activity even at low temperatures is exhibited. Meanwhile, if the Ce concentration β in the vicinity of the Pd-based nanoparticles is less than the lower limit, the interface between the Pd-based nanoparticles and the ceria nanoparticles is not sufficiently formed, so that it tends to become difficult to transfer oxygen between the Pd-based nanoparticles and the ceria nanoparticles for the prevention of adsorption poisoning of HC, and thus sufficient catalytic activity at low temperatures is difficult to be exhibited. In addition, from the viewpoint of further preventing the adsorption poisoning of HC and improving the catalytic activity at low temperature, the Ce concentration β in the vicinity of the Pd-based nanoparticles is preferably 16 to 50%, more preferably 1$ to 40%, and particularly preferably 20 to 30%.

The Ce concentration β in the vicinity of the Pd-based nanoparticles can be determined by the formula (2) using the concentration of each element obtained as follows: the n=50 to 100 regions of 162.0 am in length×162.0 nm in width centered on Pd-based nanoparticles are randomly extracted in the EDX element mapping image, and the concentration of each of the elements Pd, Al, Ce, and other metal M in each extracted region is calculated based on the DX element mapping data.

Further, in the catalyst for purification of exhaust gas of the present invention, a Pd dispersity after heating at 500° C. for 5 hours in the atmosphere (initial Pd dispersity) is preferably 15% or more. When the initial Pd dispersity is within the above range, the surface area of the active Pd-based nanoparticles for the purification reaction to proceed is secured, and thus the catalytic activity at low temperature is likely to be ensured. Meanwhile, if the initial Pd dispersity is less than the lower limit, the surface area of the active Pd-based nanoparticles for the purification reaction to proceed is insufficient, so that the catalytic activity at low temperature tends to decrease. In addition the Pd-based nanoparticles may be buried or coated with the ceria nanoparticles, in which case the contact between the Pd-based nanoparticles and the reaction gas decreases, so that the catalytic activity at low temperature tends to decrease. Further, from the viewpoint of improving the catalytic activity at low temperature, the initial Pd dispersity is preferably 15 to 80%, more preferably 15 to 60%, and particularly preferably 20 to 60%. Note that the method of calculating the Pd dispersity is as described above.

[Method for Producing Catalyst for Purification of Exhaust Gas]

Next, a method of producing the catalyst for purification of exhaust gas of the present invention is described. The method of producing the catalyst for purification of exhaust gas of the present invention includes supporting ceria nanoparticles on a composite metal oxide support containing alumina, ceria, and zirconia and then supporting Pd-based nanoparticles composed of Pd or Pd oxide thereon so that a molar ratio (Ce/Pd) of Ce and Pd supported on the composite metal oxide support is 1 to 8 (preferably 1 to 5, more preferably 2 to 5, and particularly preferably 2 to 4). When the ceria nanoparticles are supported and then the Pd-based nanoparticles are supported, it is possible to prevent the Pd-based nanoparticles from being buried in the eerie nanoparticles, and thus it is possible to obtain the catalyst for purification of exhaust gas of the present invention in which the eerie nanoparticles and the Pd-based nanoparticles are supported in proximity to each other on the composite metal oxide support containing alumina, eerie, and zirconia, and the Pd-based nanoparticles are dispersed and supported. Meanwhile, if the ceria nanoparticles and the Pd-based nanoparticles are simultaneously supported, the Pd-based nanoparticles are buried in the eerie nanoparticles, so that the Pd-based nanoparticles and the reaction gas do not sufficiently come into contact with each other, and thus in the catalyst for purification of exhaust gas obtained, the catalytic activity at low temperature decreases.

The method of supporting the ceria nanoparticles and the Pd-based nanoparticles is not particularly limited, and it is possible to employ conventionally known supporting methods such as an impregnation method, a neutralization precipitation method, a sol-gel method, an alkoxide hydrolysis method, and a nitrate aqueous solution combustion method.

In the method of producing a catalyst for purification of exhaust gas of the present invention, it is preferable that the composite metal oxide support containing alumina, ceria, and zirconia is impregnated with a compound containing tetravalent Ce (more preferably, a nitrate of the tetravalent Ce), and then drying and calcination are conducted in an oxidizing atmosphere such as in the atmosphere to support the ceria nanoparticles on the composite metal oxide support. This makes it possible to support the ceria nanoparticles as $CeO_2$ that does not easily undergo a solid phase reaction with alumina, and to support the ceria nanoparticles with high dispersion while maintaining the fine structure of the composite metal oxide support.

Further, in the method of producing a catalyst for purification of exhaust gas of the present invention, it is preferable that the above method is used to support the ceria nanoparticles on the composite metal oxide support, and then palladium nitrate is impregnated to support the Pd-based nanoparticles. This makes it possible to obtain a catalyst for purification of exhaust gas that exhibits excellent catalytic activity even at low temperatures. In addition, this catalyst for purification of exhaust gas can activate the HC purification reaction at low temperature at an early stage, and can also accelerate the activation of other noble metal active sites and promoters (such as OSC material) by the generated purification reaction heat.

EXAMPLES

Hereinafter, the present invention is described in more detail based on Examples and Comparative Examples, but the present invention is not limited to the following Examples.

Example 1

In 50.00 g of ion-exchanged water, 4.33 g of diammonium cerium nitrate was dissolved. To the resulting aqueous solution, 19.64 g of alumina-ceria-zirconia composite metal oxide powder (ACZ powder, $Al_2O_3$:$CeO_2$: $ZrO_2$:other metal oxides=30% by mass:23% by mass:39% by mass:8% by mass) was added, and the mixture was stirred for 30 minutes or more. The resulting dispersion liquid was heated while stirring on a hot stirrer to remove the solvent, and then the mixture was calcined at 400° C. for 5 hours to obtain an alumina-ceria-zirconia composite metal oxide powder supported by ceria nanoparticles (Ce-supported. ACZ powder).

Next, 0.4 g of palladium nitrate in terms of Pd atom was added to 50.00 g of ion-exchanged water. To the resulting aqueous solution, 20.00 g of the Ce-supported ACZ powder was added, and the mixture was stirred for 30 minutes or more. The resulting dispersion liquid was heated while stirring on a hot stirrer to remove the solvent, and then the mixture was calcined at 400° C. for 5 hours to obtain a catalyst powder in which the ceria nanoparticles and Pd-based nanoparticles were sequentially supported on the alumina-ceria-zirconia composite metal oxide support (Pd-2Ce/ACZ powder). In this catalyst powder, the molar ratio of Ce and Pd supported on the ACZ powder is Ce/Pd=2.

Example 2

A catalyst powder in which the eerie nanoparticles and the Pd-based nanoparticles were sequentially supported on the alumina-ceria-zirconia composite metal oxide support (Pd-4Ce/ACZ powder) was obtained in the same manner as in Example 1 except that the amount of the diammonium cerium nitrate was changed to 8.66 g and the amount of the ACZ powder was changed to 18.28 q. In this catalyst powder, the molar ratio of Ce and Pd supported on the ACZ powder is Ce/Pd=4.

Example 3

A catalyst powder in which the ceria nanoparticles and the Pd-based nanoparticles were sequentially supported on the alumina-ceria-zircon a composite metal oxide support (Pd-8 Ce/ACZ powder) was obtained in the same manner as in Example 1 except that the amount of the diammonium cerium nitrate was changed to 17.32 g and the amount of the ACZ powder was changed to 16.92 g. In this catalyst powder, the molar ratio of Ce and Pd supported on the ACZ powder is Ce/Pd=8.

Comparative Example 1

To 50.00 g of ion-exchanged water, 0.4 g of palladium nitrate in terms of Pd atom was added. To the resulting aqueous solution, 17.41 g of alumina-ceria-zirconia composite metal oxide powder (ACZ powder, $Al_2O_3$:$CeO_2$: $ZrO_2$:other metal oxides=30% by mass:23% by mass:39% by mass:8% by mass) was added, and the mixture was stirred for 30 minutes or more. The resulting dispersion liquid was heated while stirring on a hot stirrer to remove the solvent, and then the mixture was calcined at 400° C. for 5 hours to obtain an alumina-ceria-zirconia composite metal oxide powder supported by Pd-based nanoparticles (Pd/ACZ powder). The Pd/ACZ powder and 2.59 q of ceria powder were mixed by stirring for 5 minutes or more using a mortar, and then the mixture was calcined at 400° C. for 5 hours to obtain a catalyst powder composed of a physically mixed powder of the Pd/ACZ powder and the ceria powder (Pd/ACZ A+4Ce powder). In this catalyst powder, the molar ratio of Pd supported on the ACZ powder to Ce in the ceria powder is Ce/Pd=4.

Comparative Example 2

A catalyst powder composed of a physically mixed powder of the Pd/ACZ powder and the ceria powder (Pd/ACZ 8Ce powder) was obtained in the same manner as in Comparative Example 1 except that the amount of the ACZ powder was changed to 15.82 g and the amount of the ceria powder was changed to 5.18 g. In this catalyst powder, the molar ratio of Pd supported on the ACZ powder to Ce in the ceria powder is Ce/Pd.=8:

Comparative Example 3

To 20.00 g of ion-exchanged water, 0.4 g of palladium nitrate in terms of Pd atoms was added to prepare an aqueous solution of palladium nitrate. Further, 8.66 g of diammonium cerium nitrate was dissolved in 30.00 g of ion-exchanged water to prepare an aqueous solution of diammonium cerium nitrate. These aqueous solutions were mixed and stirred to prepare a precursor aqueous solution containing palladium (Pd) and cerium (Ce).

Next, to an aqueous solution prepared by mixing 13.00 g of 25% ammonia water and 50.00 g of ion-exchanged water, the precursor aqueous solution was added dropwise to prepare a sol solution. The resulting sol was filtered and washed, and then redispersed in 300 g of ion-exchanged water. To the resulting dispersion liquid, 17.41 g of alumina-ceria-zirconia composite metal oxide powder (ACZ powder, $Al_2O_3$:$CeO_2$:$ZrO_2$:other metal oxides=30% by mass:23% by mass:39% by mass:8% by mass) was added, and the mixture was stirred for 30 minutes or more. The resulting dispersion liquid was heated while stirring on a hot stirrer to remove the solvent, and then the mixture was calcined at 400° C. for 5 hours to obtain a catalyst powder in which a coprecipitate of palladium (Pd) and ceria were supported on the alumina-coria-zirconia composite metal oxide support (Pd+4Ce/ACZ powder). In this catalyst powder, the molar ratio of Pd and Ce supported on the ACZ powder is Ce/Pd=4.

Comparative Example 4

A catalyst powder in which barium oxide (BaD) nanoparticles and the Pd-based nanoparticles were sequentially supported on the alumina-ceria-zirconia composite metal oxide support (Pd-4Ba/ACZ powder) was obtained in the same manner as in Example 1 except that 6.84 q of barium acetate was used instead of the cerium diammonium nitrate and the amount of the ACZ powder was changed to 17.55 q. In this catalyst powder, the molar ratio of Ba and Pd supported on the ACZ powder is Ba/Pd=4.

Comparative Example 5

A catalyst powder in which lanthanum oxide ($La_2O_3$) nanoparticles and the Pd-based nanoparticles were sequentially supported on the alumina-ceria-zirconia composite metal oxide support (Pd-4La/ACZ powder) was obtained in the same manner as in Example 1 except that 4.03 g of lanthanum nitrate hexahydrate was used instead of the diammonium cerium nitrate and the amount of the ACZ powder was changed to 17.42 g. In this catalyst powder, the molar ratio of La and Pd supported on the ACZ powder is La/Pd=4.

Comparative Example 6

To 50.00 g of ion-exchanged water, 0.42 g of palladium nitrate in terms of Pd atom was added. To the resulting aqueous solution, 17.41 g of alumina-ceria-zirconia composite metal oxide powder (ACZ powder, $Al_2O_3$:$CeO_2$:$ZrO_2$: other metal oxides=30% by mass:23% by mass:39% by mass:8% by mass) was added, and the mixture was stirred for 30 minutes or more. The resulting dispersion liquid was heated while stirring on a hot stirrer to remove the solvent, and then the mixture was calcined at 400° C. for 5 hours to obtain a catalyst powder in which Pd-based nanoparticles were supported on the alumina-ceria-zirconia composite metal oxide support (Pd/ACZ powder). In this catalyst powder, the molar ratio of Ce and Pd supported on the ACZ powder is Ce/Pd=0.

Comparative Example 7

In 50.00 g of ion-exchanged water, 8.66 g of diammonium cerium nitrate and 0.4 g of palladium nitrate in terms of Pd atom were dissolved, To the resulting aqueous solution, 18.28 g of alumina-ceria-zirconia composite metal oxide powder (ACZ powder, $Al_2O_3$:$CeO_2$:$ZrO_2$:other metal oxides=30% by mass:2.3% by mass:39% by mass:8% by mass) was added, and the mixture was stirred for 30 minutes or more. The resulting dispersion liquid was heated at 150° C. all day to remove the solvent, and then the mixture was calcined at 400° C. for 5 hours to obtain a catalyst powder in which ceria nanoparticles and Pd-based nanoparticles were simultaneously supported on the alumina-ceria-zirconia composite metal oxide support (Pd-4Ce simultaneous support/ACZ powder). In this catalyst powder, the molar ratio of Ce and Pd supported on the ACZ powder is Ce/Pd=4.

Comparative Example 8

A catalyst powder in which the ceria nanoparticles and the Pd-based nanoparticles were sequentially supported on an alumina support (Pd-4Ce/Al powder) was obtained in the same manner as in Example 2 except that 18.28 g of alumina powder was used instead of the ACZ powder. In this catalyst powder, the molar ratio of Ce and Pd supported on the alumina powder is Ce/Pd=4.

<Energy Dispersive X-Ray Analysis>

The catalyst powders obtained in Examples and Comparative Examples were each subjected to energy dispersive X-ray (EDX) analysis under the conditions of an acceleration voltage of 200 kV and a field magnification of $1.2 \times 10^6$ times using a scanning transmission electron microscope equipped with an energy dispersive X-ray analyzer ("JEM-ARM200F NEOARM" manufactured by JEOL Ltd.). As a result, an EDX element mapping image of 512 pixels in length×512 pixels in width was acquired, and a distribution map of each element of Al, Ce, Zr, Pd, and O was obtained.

<Pd—Ce Proximity α>

Based on the Pd distribution map and the Ce distribution map obtained by the EDX analysis, the proximity α (Pd—Ce proximity α) between Pd and Ce supported on the metal oxide support was determined by the following formula (1):

$$\alpha = \frac{\sum_{j=0}^{N-1}\sum_{i=0}^{M-1}((I(i,j)-I_{ave})(T(i,j)-T_{ave}))}{\sqrt{\sum_{j=0}^{N-1}\sum_{i=0}^{M-1}(I(i,j)-I_{ave})^2 - \sum_{j=0}^{N-1}\sum_{i=0}^{M-1}(T(i,j)-T_{ave})^2}} \quad (1)$$

[In the formula (1), $I(i, j)$ represents a luminance value of a pixel, which is i-th in a horizontal direction and j-th in a vertical direction, in the Pd distribution map (M=512, N=512), $I_{ave}$ represents an average luminance value in the Pd distribution map, $T(i, j)$ represents a luminance value of a pixel, which is i-th in the horizontal direction and j-th in the vertical direction, in the Ce distribution map (M=512, N=512), and $T_{ave}$ represents an average luminance value in the Ce distribution map.].

Specifically, image processing software ImageJ or Matlab was used on the Pd distribution map and the Ce distribution map to calculate a coefficient value of a zero-means normalized cross-correlation (MCC), and the coefficient value was defined as the Pd Ce proximity α. Table 1 and FIG. 1 show the results.

<Ce Concentration β in the Vicinity of Pd-Based Nanoparticles>

In the EDX element mapping image obtained by the EDX analysis, n=50 to 100 regions of 162.0 nm in length×162.0 nm in width centered on Pd-based nanoparticles were randomly extracted, and the concentration of each of the elements Pd, Al, Ce, and other metal M in each extracted region was calculated based on the EDX element mapping data. The obtained concentration of each element was used to determine the Ce concentration β [%] in the vicinity of Pd-based nanoparticles by the following formula (2)

$$\beta = \frac{1}{n}\sum_{k=1}^{n}\left(C_{Ce}/\left(C_{Pd}+C_{Al}+C_{Ce}+\sum C_{M}\right)\times 100\right) \quad (2)$$

Figure 2:
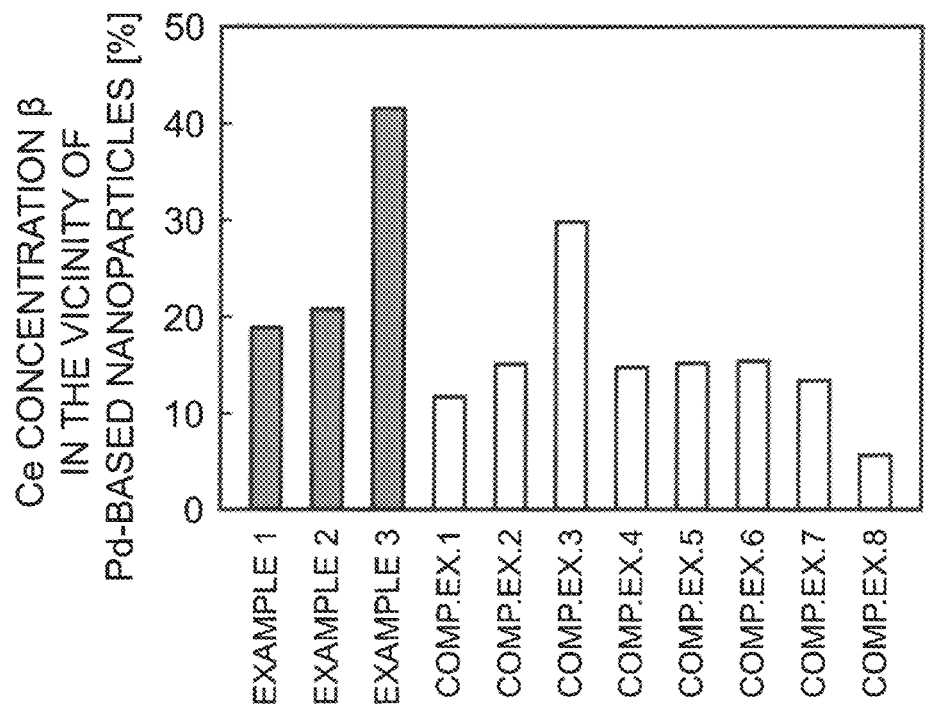
FIG. 2 is a graph showing the Ce concentration β in the vicinity of Pd-based nanoparticles in the catalyst powders obtained in Examples and Comparative Examples.

[In the formula (2), n is a total number of extracted regions, and $C_{Ce}$, $C_{Pd}$, $C_{Al}$ and $C_M$ represent concentrations of Ce, Pd, Al, and other metal M in respective extracted regions.]. Table 1 and FIG. 2 show the results.

<Initial Pd Dispersity>

The catalyst powders obtained in Examples and Comparative Examples were each calcined in the air at 500° C. for 5 hours. In a U-shaped quartz sample tube, 0.5 g of the catalyst powder after the calcination was filled. The catalyst powder was heated at 300° C. for 15 minutes while flowing $O_2$ (100%), and then heated at 400° C. for 15 minutes while flowing $H_2$ (100%) for pretreatment. CO was pulse-flowed to the catalyst powder after the pretreatment multiple times at 0.0188 ml/pulse while cooling to −78° C. with dry ice. During this period, the amount of CO not adsorbed on the catalyst powder was measured using a thermal conductivity detector, and the amount of CO adsorbed when the number of pulses and the adsorption were saturated was determined. From the obtained amount of CO adsorbed and amount of Pd supported, the initial Pd dispersity was calculated by the following formula:

Pd dispersity[%]=amount of CO adsorbed[mol]/ amount of Pd supported[mol]×100 and the initial average particle diameter of the Pd-based nanoparticles was calculated by the following formula (3):

$$\text{Average particle diameter [nm]} = \frac{f_m \times M_{Pd}}{\rho_{Pd} \times N_A \times \pi \times r_{Pd}^2 \times D} \quad (3)$$

[In the formula (3), $f_m$ represents a shape factor (=6), $M_{Pd}$ represents the atomic weight of Pd (=106.4 g/mol), $\rho_{Pd}$ represents the density of Pd (=12.02 g/cm$^3$), $N_A$ represents the Avogadro constant, $r_{Pd}$ represents the atomic radius of Pd (=1.37×10$^{-8}$ cm), and D represents the initial Pd dispersity.] Table 1 shows those results.

<Heat-Resistance Test>

Using an isostatic pressing device ("CK4-22-60" manufactured by Nikkiso Co., Ltd.), 10 g of each of the catalyst powders obtained in Examples and Comparative Examples was subjected to cold isostatic pressing (CIP) for 1 minute at a pressure of 1 t. The resulting molded product was pulverized into pellets having a diameter of 0.5 to 1.0 mm. In a reaction tube, 2.0 g of these catalyst pellets were filled, and subjected to a heat-resistance test by heating at 1050° C. for 25 hours while alternately flowing rich gas ($H_2$ (2 vol %)+$CO_2$ (10 vol %)+$H_2O$ (3 vol)+$N_2$ (balance)) and lean gas ($O_2$ (1 vol %)+$CO_2$ (10 vol %)+$H_2O$ (3 vol %)+$N_2$ (balance)) at a flow rate of 0.5 L/min every 5 minutes.

<Pd Dispersity after Heat-Resistance Test>

In a U-shaped quartz sample tube, 0.5 g of the catalyst powder after the heat-resistance test was filled. The catalyst powder was heated at 300° C. for 15 minutes while flowing $O_2$ (100%), and then heated at 400° C. for 15 minutes while flowing $H_2$ (100%) for pretreatment. CO was pulse-flowed to the catalyst powder after the pretreatment multiple times at 0.0188 ml/pulse in a He (100%) atmosphere while cooling to −78° C. with dry ice. During this period, the amount of CO not adsorbed on the catalyst powder was measured using a thermal conductivity detector, and the amount of CO adsorbed when the number of pulses and the adsorption were saturated was determined.

From the obtained amount of CO adsorbed and amount of Pd supported, the Pd dispersity after the heat-resistance test was calculated by the following formula:

Pd dispersity[%]=amount of CO adsorbed[mol]/ amount of Pd supported[mol]×100.

Figure 3:
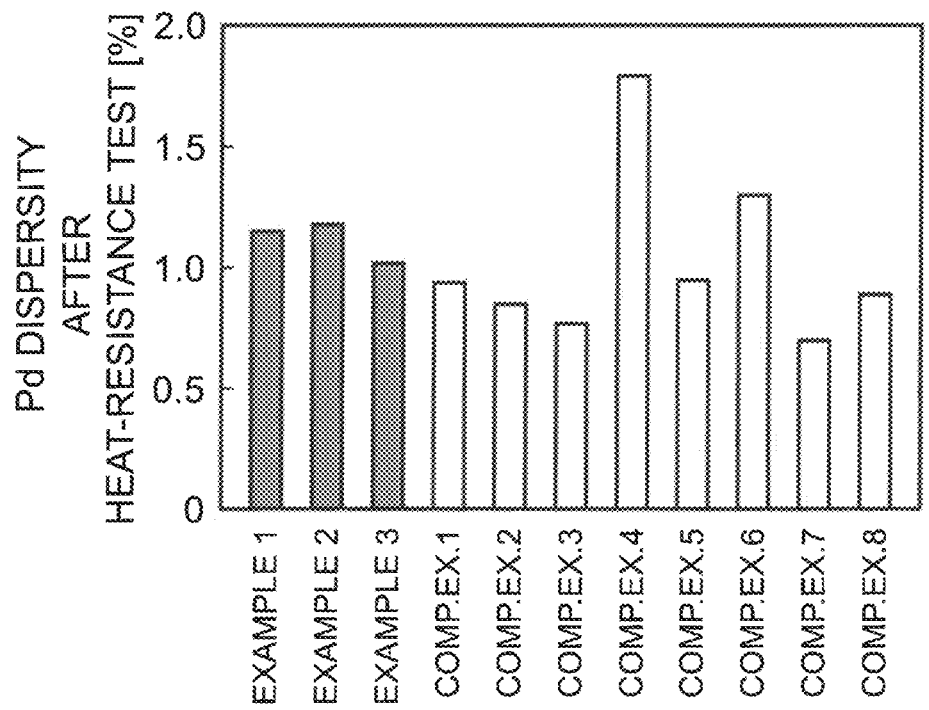
FIG. 3 is a graph showing the Pd dispersity in the catalyst powders obtained in Examples and Comparative Examples after the heat-resistance test.

Table 1 and FIG. 3 show the results.

In addition, the average particle diameter of the Pd-based nanoparticles after the heat-resistance test was calculated by the following formula (3)

$$\text{Average particle diameter [nm]} = \frac{f_m \times M_{Pd}}{\rho_{Pd} \times N_A \times \pi \times r_{Pd}^2 \times D} \quad (3)$$

[In the formula (3), $f_m$ represents a shape factor (=6), $M_{Pd}$ represents the atomic weight of Pd (=106.4 g/mol), $\rho_{Pd}$ represents the density of Pd (=12.02 g/cm$^3$), $N_A$ represents the Avogadro constant, $r_{Pd}$ represents the atomic radius of Pd (=1.37×10$^{-8}$ cm), and D represents the Pd dispersity.]. Table 1 shows those results.

<Solid Phase Reaction Product after Heat-Resistance Test>

Figure 4:
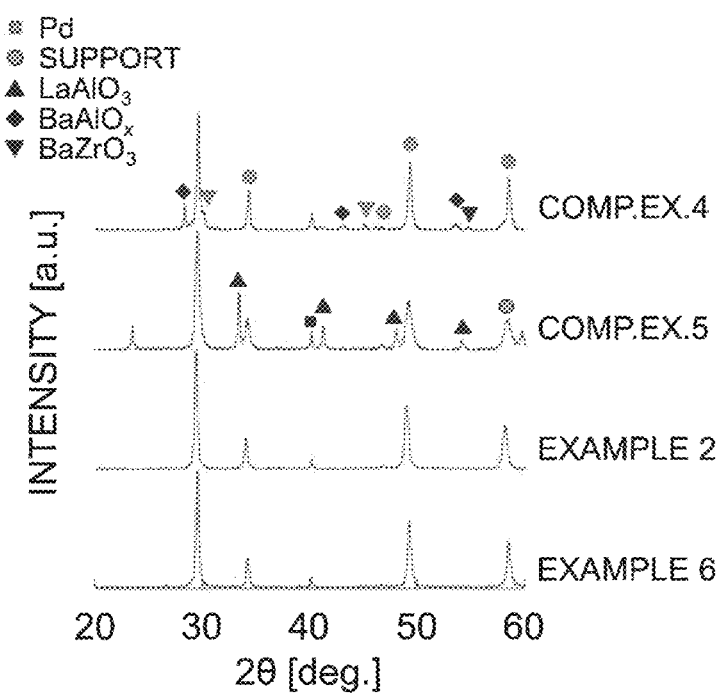
FIG. 4 is a graph showing the X-ray diffraction pattern of the catalyst powders obtained in Examples 2 and 6 and Comparative Examples 4 and 5 after the heat-resistance test.

The catalyst powder after the heat-resistance test was subjected to powder X-ray diffraction measurement to identify the solid phase reaction product produced by the heat-resistance test. FIG. 4 and Table 1 show the results.

<Oxygen Release Rate>

Figure 5:
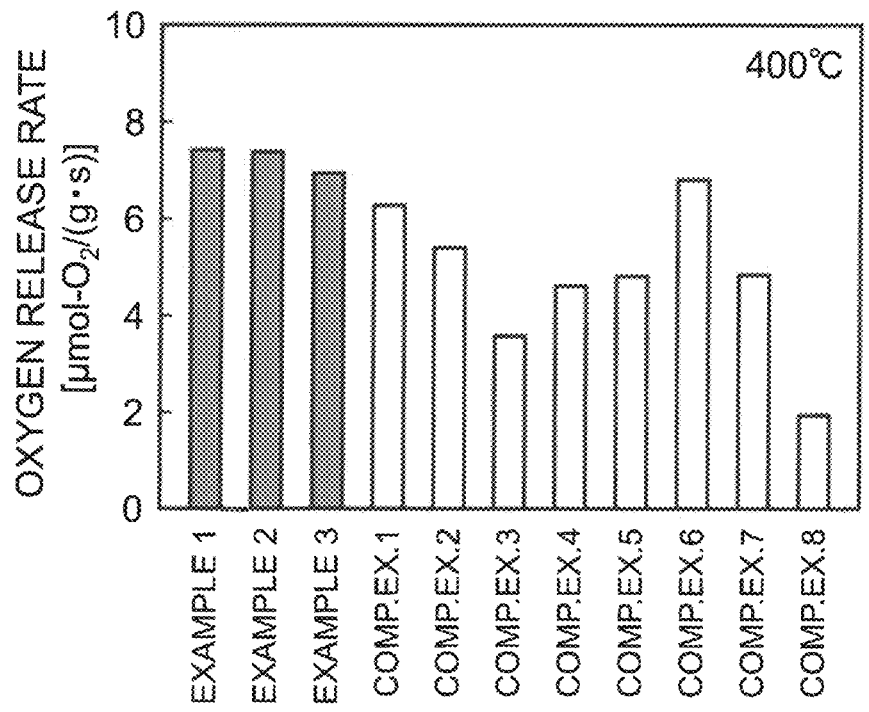
FIG. 5 is a graph showing the oxygen release rate at 400° C. of the catalyst powders obtained in Examples and Comparative Examples.

In a sample holder having a diameter of 10 mm, 0.5 g of the catalyst powder after the heat-resistance test was encapsulated, and mounted on a fixed-bed flow catalytic activity evaluation device ("CATA-5000-7SP" manufactured by Best. Instruments Co., Ltd.). This catalyst bed was subjected to pretreatment by heating at a catalyst inlet gas temperature of 600° C. for 12 minutes while and alternately flowing rich gas (CO (2 vol %)+$N_2$ (balance)) and lean gas ($O_2$(1 vol %)+$N_2$ (balance)) at a flow rate of 10 L/min every 3 minutes. After that, the catalyst inlet gas temperature was maintained at 400° C., and the amount of $CO_2$ produced when the flowing gas was switched from the lean gas to the rich gas was measured in a steady state. From this amount of $CO_2$ produced, the oxygen release rate was calculated. Table 2 and FIG. 5 show the results.

<Catalytic Activity at Cold Start ($C_3H_6$ Purification Rate)>

In a sample holder having a diameter of 18 mm, 1.5 g of the catalyst powder after the heat-resistance test was encapsulated, and mounted on a fixed-bed flow catalytic activity evaluation device ("CATA-5000-7SP" manufactured by Best. Instruments Co., Ltd.). This catalyst bed was subjected to pretreatment by heating at a catalyst inlet gas temperature of 600° C. for 5 minutes while and alternately flowing rich gas ($CO_2$ (10 vol %)+O2 (0.646 vol %)+CO (1.121 vol')+NO (1200 ppm)+$C_3H_6$ (1600 ppmC)++$H_2$ (0.374 vol %)+$H_2O$ (3 vol %)+$N_2$ (balance)) and lean alas ($CO_2$ (10 vol %)+O2 (0.748 vol %)+CO (0.7 vol %)+NO (1200 ppm)+$C_3H_6$ (1600 ppmC)+$H_2$ (0.233 vol %)+$H_2O$ (3 vol %)+$N_2$ (balance)) at a flow rate of 20 L/min every 10 seconds, and then cooled by passing $N_2$ gas through the catalyst until the catalyst temperature reached 50° C.

Figure 6:
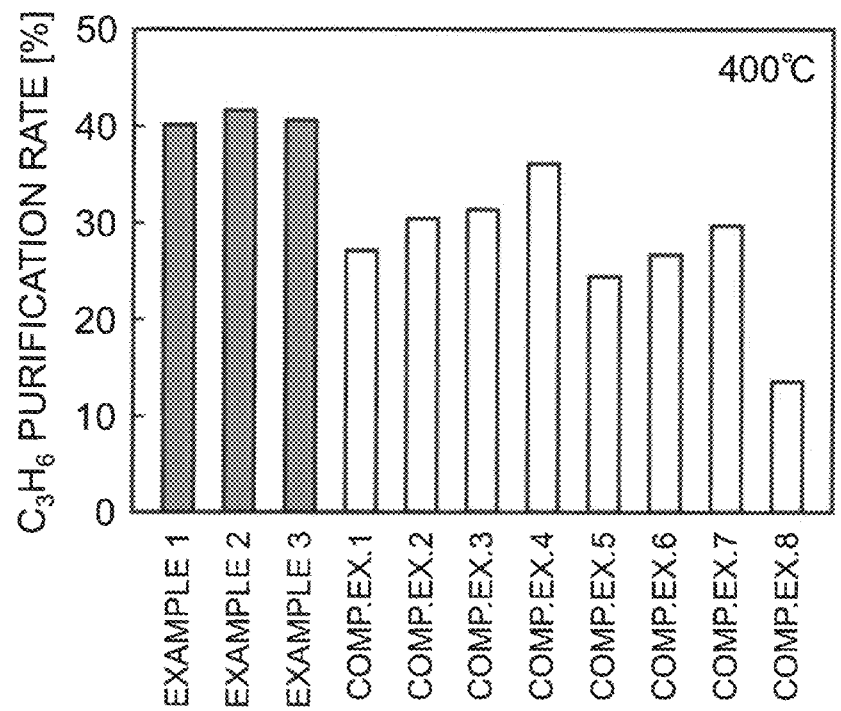
FIG. 6 is a graph showing the $C_3H_6$ purification rate at 400° C. of the catalyst powders obtained in Examples and Comparative Examples.

Next, the activity evaluation gas ($CO_2$ (14 vol %)+$O_2$ (0.55 vol %)+CO (0.52 vol)+NO (3000 ppm)+$C_3H_6$ (3000 ppmC)+$H_2O$ (3 vol %)+NO (balance)) heated to 750° C. was flowed through the catalyst bed at a flow rate of 20 L/min, and the $C_3H_6$ concentration in the catalyst outlet gas when the catalyst temperature reached 400° C. was measured to calculate the $C_3H_6$ purification rate. Table 2 and FIG. 6 show the results.

TABLE 2

|  | Oxygen Release Rate [μmol-$O_2$/(g · s)] | Activity at Cold Start ($C_3H_6$ Purification Rate) [%] |
|---|---|---|
| Example 1 | 7.46 | 40.3 |
| Example 2 | 7.42 | 41.8 |
| Example 3 | 6.98 | 40.7 |

TABLE 2-continued

|  | Oxygen Release Rate [μmol-$O_2$/(g · s)] | Activity at Cold Start ($C_3H_6$ Purification Rate) [%] |
|---|---|---|
| Comp. Ex. 1 | 6.32 | 27.3 |
| Comp. Ex. 2 | 5.44 | 30.6 |
| Comp. Ex. 3 | 3.62 | 31.5 |
| Comp. Ex. 4 | 4.66 | 36.3 |
| Comp. Ex. 5 | 4.84 | 24.6 |
| Comp. Ex. 6 | 6.84 | 26.9 |
| Comp. Ex. 7 | 4.88 | 29.9 |
| Comp. Ex. 8 | 1.98 | 13.8 |

As shown in Table 1 and FIGS. 1 to 3, it was found that in the catalysts in which the ceria nanoparticles and the Pd-based nanoparticles were sequentially supported on the ACZ powder (Examples 1 to 3), the Pd—Ce proximity α, the Ce concentration β in the vicinity of the Pd-based nanoparticles, and the initial. Pd dispersity and the Pd dispersity after the heat-resistance test were within the predetermined ranges.

Meanwhile, it was found that in the catalysts in which the Pd/ACZ powder and the ceria powder were physically mixed (Comparative Examples 1 and 2), the catalyst in which the BaO nanoparticles and the Pd-based nanoparticles were sequentially supported on the ACZ powder (Comparative Example 4), the catalyst in which the $La_2O_3$ nanoparticles and the Pd-based nanoparticles were sequentially supported on the ACZ powder (Comparative Example 5), the catalyst in which only the Pd-based nanoparticles were supported on the ACZ powder (Comparative Example 6), the catalyst in which the ceria nanoparticles and the Pd-based nanoparticles were simultaneously supported on the ACZ powder (Comparative Example 7), and the catalyst in which the ceria nanoparticles and the Pd-based nanoparticles were sequentially supported on the alumina powder (Comparative Example 8), the Pd—Ce proximity α and the Ce concentration β in the vicinity of the Pd-based nanoparticles were small. Further, it was found that in the catalyst in which

TABLE 1

|  | Support | Support Method | Ce/Pd | Pd—Ce Proximity α | Ce Concentration β in the Vicinity of Pd-based Nanoparticles [%] | Initial Pd Dispersity [%] (Value in Terms of Particle Diameter [nm]) | Pd Dispersity after Heat-Resistance Test [%] (Value in Terms of Particle Diameter [nm]) | Solid Phase Reaction Product after Heat-Resistance Test |
|---|---|---|---|---|---|---|---|---|
| Example 1 | ACZ | Sequential | 2 | 0.18 | 19.1 | 16.2 (3.0) | 1.15 (41.9) | None |
| Example 2 | ACZ | Sequential | 4 | 0.20 | 21.0 | 16.4 (2.9) | 1.18 (41.3) | None |
| Example 3 | ACZ | Sequential | 8 | 0.32 | 41.7 | 18.2 (2.7) | 1.04 (46.8) | None |
| Comp. Ex. 1 | ACZ | Physical Mixing | 4 | 0.08 | 11.9 | 19.6 (2.5) | 0.94 (52.0) | None |
| Comp. Ex. 2 | ACZ | Physical Mixing | 8 | 0.10 | 15.3 | 22.9 (2.1) | 0.85 (56.9) | None |
| Comp. Ex. 3 | ACZ | Coprecipitation | 4 | 0.30 | 30.0 | 7.0 (6.9) | 0.77 (63.4) | None |
| Comp. Ex. 4 | ACZ | Sequential | Ba/Pd = 4 | 0.06 | 15.0 | 14.6 (3.3) | 1.79 (27.0) | $BaAlO_x$, $BaZrO_3$ |
| Comp. Ex. 5 | ACZ | Sequential | La/Pd = 4 | 0.06 | 15.4 | 30.4 (1.6) | 0.95 (51.0) | $LaAlO_x$, |
| Comp. Ex. 6 | ACZ | — | 0 | 0.07 | 15.6 | 13.0 (3.7) | 1.30 (37.0) | None |
| Comp. Ex. 7 | ACZ | Simultaneous | 4 | 0.11 | 13.6 | 13.5 (3.6) | 0.70 (66.0) | None |
| Comp. Ex. 8 | Alumina | Sequential | 4 | 0.06 | 5.9 | 23.6 (2.0) | 0.89 (53.8) | None | the EaO nanoparticles and the Pd-based nanoparticles were sequentially supported on the ACZ powder (Comparative Example 4) and the catalyst in which only the Pd-based nanoparticles were supported on the ACZ powder (Comparative Example 6), the initial Pd dispersity was small. Moreover, it was found that in the catalyst in which the ceria nanoparticles and the Pd-based nanoparticles were simultaneously supported on the ACZ powder (Comparative Example 7), the initial Pd dispersity and the Pd dispersity after the heat-resistance test was small.

It was also found that in the catalyst in which the coprecipitates of ceria and Pd were supported on the ACZ powder (Comparative Example 3), the Pd—Ce proximity α and the Ce concentration β in the vicinity of the Pd-based nanoparticles were within the predetermined ranges, but the initial Pd dispersity and the Pd dispersity after the heat-resistance test was small.

As shown in Table 1 and FIG. 4, in the catalysts in which the ceria nanoparticles and the Pd-based nanoparticles were sequentially supported on the ACZ powder (Examples 1 to 3), the catalysts in which the Pd/ACZ powder and the ceria powder were physically mixed (Comparative Examples 1 and 2), the catalyst in which the coprecipitates of ceria and Pd were supported on the ACZ powder (Comparative Example 3), the catalyst in which only the Pd-based nanoparticles were supported on the ACZ powder (Comparative Example 6), the catalyst in which the ceria nanoparticles and the Pd-based nanoparticles were simultaneously supported on the ACZ powder (Comparative Example 7), and the catalyst in which the ceria nanoparticles and the Pd-based nanoparticles were sequentially supported on the alumina powder (Comparative Example 8), no solid phase reaction product was produced even when the heat resistance test was performed. However, it was found that in the catalyst in which the BaO nanoparticles and the Pd-based nanoparticles were sequentially supported on the ACZ powder (Comparative Example 4) and the catalyst in which the La$_2$O$_3$ nanoparticles and the Pd-based nanoparticles were sequentially supported on the ACZ powder (Comparative Example 5), the heat-resistance test caused a solid phase reaction of Ba or La with the alumina or zirconia in the support, and thus BaAlO$_x$, BaZrO$_3$, and LaAlO$_3$ were produced.

As shown in Table 2 and FIG. 5, it was found that the catalysts in which the ceria nanoparticles and the Pd-based nanoparticles were sequentially supported on the ACZ powder (Examples 1 to 3) had a higher oxygen release rate than those of the catalysts in which the Pd/ACZ powder and the ceria powder were physically mixed (Comparative Examples 1 and 2), the catalyst in which the coprecipitates of ceria and Pd were supported on the ACZ powder (Comparative Example 3), the catalyst in which the BaO nanoparticles and the Pd-based nanoparticles were sequentially supported on the ACZ powder (Comparative Example 4), the catalyst in which the La$_2$O$_3$ nanoparticles and the Pd-based nanoparticles were sequentially supported on the ACZ powder (Comparative Example 5), the catalyst in which the ceria nanoparticles and the Pd-based nanoparticles were simultaneously supported on the ACZ powder (Comparative Example 7), and the catalyst in which the ceria nanoparticles and the Pd-based nanoparticles were sequentially supported on the alumina powder (Comparative Example 8).

Further, as shown in Table 2 and FIG. 6, it was found that the catalysts in which the ceria nanoparticles and the Pd-based nanoparticles were sequentially supported on the ACZ powder (Examples 1 to 3) had a higher C$_3$H$_6$ purification rate at the time of cold start and a more excellent catalytic activity than those of the catalysts in which the Pd/ACZ powder and the ceria powder were physically mixed (Comparative Examples 1 and 2), the catalyst in which the coprecipitates of ceria and Pd were supported on the ACZ powder (Comparative Example 3), the catalyst in which the BaO nanoparticles and the Pd-based nanoparticles were sequentially supported on the ACZ powder (Comparative Example 4), the catalyst in which the La$_2$O$_3$ nanoparticles and the Pd-based nanoparticles were sequentially supported on the ACZ powder (Comparative Example 5), the catalyst in which only the Pd-based nanoparticles were supported on the ACZ powder (Comparative Example 6), the catalyst in which the ceria nanoparticles and the Pd-based nanoparticles were simultaneously supported on the ACZ powder (Comparative Example 7), and the catalyst in which the ceria nanoparticles and the Pd-based nanoparticles were sequentially supported on the alumina powder (Comparative Example 8).

Figure 7:
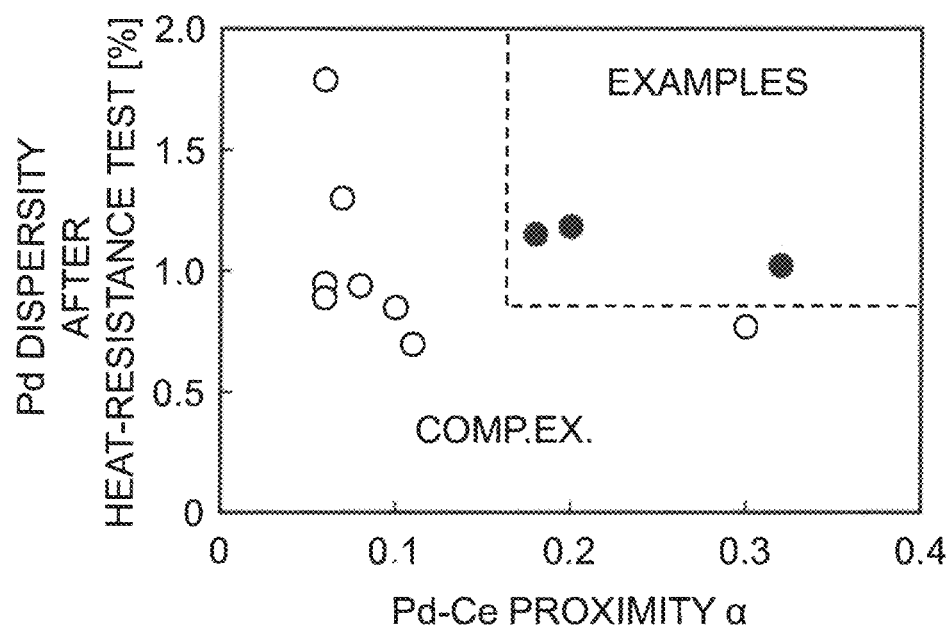
FIG. 7 is a graph showing the relationship between the proximity α between Pd and Ce and the Pd dispersity after the heat-resistance test.
Figure 8:
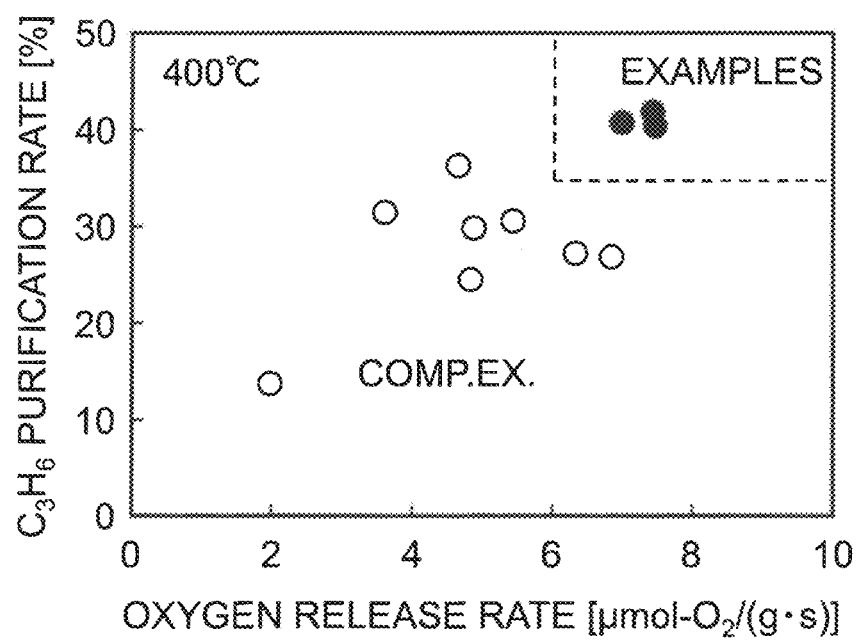
FIG. 8 is a graph showing the relationship between the oxygen release rate at 400° C. and the $C_3H_6$ purification rate at 400° C.

Based on the above results, the Pd dispersity after the heat-resistance test was plotted against the Pd—Ce proximity α. FIG. 7 shows the results. Also, the purification rate at 400° C. was plotted against the oxygen release rate at 400° C. FIG. 8 shows the results. As is apparent from the comparison between FIGS. 7 and 8, it was found that the catalysts of which the Pd—Ce proximity α and the Pd dispersity after the heat-resistance test both were large (Examples) were excellent in both the oxygen release rate and the C$_3$H$_6$ purification rate, compared with the catalysts of which at least one of the Pd—Ce proximity α and the Pd dispersity after the heat-resistance test was small (Comparative Examples), As described above, the present invention makes it possible to obtain a catalyst for purification of exhaust gas which is excellent in catalytic activity at low temperature and also in oxygen storage/release performance after exposure to high temperature. Therefore, the catalyst for purification of exhaust gas of the present invention is useful as a catalyst for purifying harmful components such as hydrocarbons (HC) contained in gas discharged from internal combustion engines such as automobile engines.

What is claimed is:

1. A catalyst for purification of exhaust gas in which Pd-based nanoparticles composed of Pd or Pd oxide and ceria nanoparticles represented by a compositional formula CeO$_{2-x}$ wherein 0≤x<0.5 are supported on a composite metal oxide support containing alumina, ceria, and zirconia, wherein
   a molar ratio Ce/Pd of Ce and Pd supported on the composite metal oxide support is 1 to 8,
   a proximity α between Pd and Ce is 0.15 to 0.50, wherein the proximity α is determined, based on a Pd distribution map and a Ce distribution map in an element mapping image obtained by energy dispersive X-ray analysis, by the following formula (1):

$$\alpha = \frac{\sum_{j=0}^{N-1} \sum_{i=0}^{M-1} ((I(i,j) - I_{ave})(T(i,j) - T_{ave}))}{\sqrt{\sum_{j=0}^{N-1} \sum_{i=0}^{M-1} (I(i,j) - I_{ave})^2 \cdot \sum_{j=0}^{N-1} \sum_{i=0}^{M-1} (T(i,j) - T_{ave})^2}} \quad (1)$$

in the formula (I), I(i, j) represents a luminance value in a section (i, j), which is i-th in a horizontal direction and j-th in a vertical direction, when the Pd distribution map is divided into M pieces in the horizontal direction and N pieces in the vertical direction, I$_{ave}$ represents an average luminance value in the Pd distribution map, T(i, j) represents a luminance value in a section (i, j), which is i-th in a horizontal direction and j-th in a vertical direction, when the Ce distribution map is divided into M pieces in the horizontal direction and N pieces in the vertical direction, and T$_{ave}$ represents an average luminance value in the Ce distribution map, and
   a Pd dispersity after a heat-resistance test is 0.8% or more, wherein the heat-resistance test is conducted by heating at 1050° C. for 25 hours while alternately flowing rich gas of 2 vol % $H_2$+10 vol % $CO_2$+3 vol % $H_2O$+$N_2$ in balance and lean gas of 1 vol % $O_2$+10 vol % $CO_2$+3 vol % $H_2O$+$N_2$ in balance at a flow rate of 0.5 L/min every 5 minutes.

2. The catalyst for purification of exhaust gas according to claim 1, wherein a Ce concentration β in the vicinity of the Pd-based nanoparticles is 16% or more, wherein the Ce concentration β is determined, based on an element mapping image obtained by energy dispersive X-ray analysis, by the following formula (2):

$$\beta = \frac{1}{n}\sum_{k=1}^{n}\left(C_{Ce}/\left(C_{Pd} + C_{Al} + C_{Ce} + \sum C_{M}\right) \times 100\right) \quad (2)$$

in the formula (2), n is a total number of regions of 162.0 nm in length x 162.0 nm in width centered on the Pd-based nanoparticles randomly extracted in the element mapping image, and $C_{Ce}$, $C_{Pd}$, $C_{Al}$, and $C_{M}$ represent concentrations of Ce, Pd, Al, and other metal M in respective extracted regions.

3. The catalyst for purification of exhaust gas according to claim 2, wherein a Pd dispersity after heating at 500° C. for 5 hours in the atmosphere is 15% or more.

4. The catalyst for purification of exhaust gas according to claim 1, wherein a Pd dispersity after heating at 500° C. for 5 hours in the atmosphere is 15% or more.

5. A method of producing a catalyst for purification of exhaust gas, comprising:

supporting ceria nanoparticles represented by a compositional formula $CeO_{2-x}$ wherein 0≤x<0.5 on a composite metal oxide support containing alumina, ceria, and zirconia, and then supporting Pd-based nanoparticles composed of Pd or Pd oxide thereon so that a molar ratio Ce/Pd of Ce and Pd supported on the composite metal oxide support is 1 to 8, to obtain the catalyst for purification of exhaust gas according to claim 1.

6. The method of producing a catalyst for purification of exhaust gas according to claim 5, wherein the composite metal oxide support containing alumina, ceria, and zirconia is impregnated with a compound containing tetravalent Ce to support the ceria nanoparticles on the composite metal oxide support.

7. The method of producing a catalyst for purification of exhaust gas according to claim 6, wherein the compound containing tetravalent Ce is a nitrate of the tetravalent Ce.

8. The method of producing a catalyst for purification of exhaust gas according to claim 7, wherein the composite metal oxide support containing alumina, ceria, and zirconia is impregnated with palladium nitrate to support the Pd-based nanoparticles on the composite metal oxide support.

9. The method of producing a catalyst for purification of exhaust gas according to claim 6, wherein the composite metal oxide support containing alumina, ceria, and zirconia is impregnated with palladium nitrate to support the Pd-based nanoparticles on the composite metal oxide support.

10. The method of producing a catalyst for purification of exhaust gas according to claim 5, wherein the composite metal oxide support containing alumina, ceria, and zirconia is impregnated with palladium nitrate to support the Pd-based nanoparticles on the composite metal oxide support.

\* \* \* \* \*

UNITED STATES PATENT AND TRADEMARK OFFICE
CERTIFICATE OF CORRECTION

PATENT NO. : 11,969,712 B2
APPLICATION NO. : 17/979571
DATED : April 30, 2024
INVENTOR(S) : Naoki Kumatani et al.

Page 1 of 2

It is certified that error appears in the above-identified patent and that said Letters Patent is hereby corrected as shown below:

On the Title Page

In the Abstract, Line 4, change:

"
$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 - \sum_{j=0}^{N-1}\sum_{i=0}^{M-1}(T(i,j) - T_{ave})^2}} \quad (1)$$
"

To:

--
$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 \times \sum_{j=0}^{N-1}\sum_{i=0}^{M-1}(T(i,j) - T_{ave})^2}} \quad (1)$$
--

In the Specification

Column 2, Line 49, change:

"
$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 - \sum_{j=0}^{N-1}\sum_{i=0}^{M-1}(T(i,j) - T_{ave})^2}} \quad (1)$$
"

To:

--
$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 \times \sum_{j=0}^{N-1}\sum_{i=0}^{M-1}(T(i,j) - T_{ave})^2}} \quad (1)$$
--

Signed and Sealed this
Fifteenth Day of October, 2024

Katherine Kelly Vidal
*Director of the United States Patent and Trademark Office*

CERTIFICATE OF CORRECTION (continued)
U.S. Pat. No. 11,969,712 B2

Column 6, Line 51, change:

"
$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 - \sum_{j=0}^{N-1}\sum_{i=0}^{M-1}(T(i,j) - T_{ave})^2}} \quad (1)$$
"

To:

$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 \times \sum_{j=0}^{N-1}\sum_{i=0}^{M-1}(T(i,j) - T_{ave})^2}} \quad (1)$$

--

Column 13, Line 6, change:

"
$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 - \sum_{j=0}^{N-1}\sum_{i=0}^{M-1}(T(i,j) - T_{ave})^2}} \quad (1)$$
"

To:

$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 \times \sum_{j=0}^{N-1}\sum_{i=0}^{M-1}(T(i,j) - T_{ave})^2}} \quad (1)$$

--

Column 18, Line 46, change:

"
$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 - \sum_{j=0}^{N-1}\sum_{i=0}^{M-1}(T(i,j) - T_{ave})^2}} \quad (1)$$
"

To:

$$= \frac{\sum_{j=0}^{N-1}\sum_{i=0}^{M-1}((I(i,j) - I_{ave})(T(i,j) - T_{ave}))}{\sqrt{\sum_{j=0}^{N-1}\sum_{i=0}^{M-1}(I(i,j) - I_{ave})^2 \times \sum_{j=0}^{N-1}\sum_{i=0}^{M-1}(T(i,j) - T_{ave})^2}} \quad (1)$$

--